United States Patent
Jang et al.

(10) Patent No.: US 10,056,577 B2
(45) Date of Patent: Aug. 21, 2018

(54) BATTERY CELL OF NOVEL STRUCTURE

(71) Applicant: LG Chem, Ltd., Seoul (KR)

(72) Inventors: Pillgyu Jang, Daejeon (KR); Soonho Ahn, Seoul (KR); Sang Baek Ryu, Daejeon (KR); Ki Woong Kim, Daejeon (KR)

(73) Assignee: LG Chem, Ltd. (KR)

(*) Notice: Subject to any disclaimer, the term of this patent is extended or adjusted under 35 U.S.C. 154(b) by 327 days.

(21) Appl. No.: 14/224,778

(22) Filed: Mar. 25, 2014

(65) Prior Publication Data

US 2014/0205879 A1 Jul. 24, 2014

Related U.S. Application Data

(63) Continuation of application No. PCT/KR2012/009312, filed on Nov. 7, 2012.

(30) Foreign Application Priority Data

Nov. 10, 2011 (KR) .......... 10-2011-0116731

(51) Int. Cl.
*H01M 2/02* (2006.01)
*H01M 10/04* (2006.01)
(Continued)

(52) U.S. Cl.
CPC ......... *H01M 2/0217* (2013.01); *H01M 2/021* (2013.01); *H01M 2/026* (2013.01);
(Continued)

(58) Field of Classification Search
None
See application file for complete search history.

(56) References Cited

U.S. PATENT DOCUMENTS

2002/0090545 A1 7/2002 Okochi et al.
2003/0072993 A1* 4/2003 Kim .................... H01M 2/1653
429/94
(Continued)

FOREIGN PATENT DOCUMENTS

CN 1185861 A 6/1998
JP 08287953 11/1996
(Continued)

OTHER PUBLICATIONS

International Search Report for Application No. PCT/KR2012/009312 dated Mar. 9, 2013.

*Primary Examiner* — Barbara L Gilliam
*Assistant Examiner* — Adam A Arciero
(74) *Attorney, Agent, or Firm* — Lerner, David, Littenberg, Krumholz & Mentlik, LLP (57) ABSTRACT

Disclosed herein is a battery cell configured to have a structure in which an electrode assembly is mounted in a battery case formed of a laminate sheet including a resin layer and a metal layer in a state in which the electrode assembly are connected to electrode terminals protruding outward from the battery case. The electrode assembly is configured such that separators are respectively disposed between cathodes and anodes, each of which is formed by applying a compound including an electrode active material to a current collector. At least a portion of an inside of the battery case corresponding to an outer circumference of the electrode assembly has an upward sloping structure in which a width of the battery case increases upward in vertical section or a downward sloping structure in which the width of the battery case increases downward in vertical section.

11 Claims, 5 Drawing Sheets

(51) Int. Cl.
*H01M 10/052* (2010.01)
*H01M 10/0525* (2010.01)
*H01M 10/0585* (2010.01)
*H01M 10/0587* (2010.01)

(52) U.S. Cl.
CPC ....... *H01M 2/0277* (2013.01); *H01M 2/0285* (2013.01); *H01M 2/0287* (2013.01); *H01M 10/0431* (2013.01); *H01M 10/0463* (2013.01); H01M 10/052 (2013.01); H01M 10/0525 (2013.01); H01M 10/0585 (2013.01); H01M 10/0587 (2013.01)

(56) References Cited

U.S. PATENT DOCUMENTS

2003/0194607 A1* 10/2003 Huang ................ H01M 4/5815
429/176
2008/0305398 A1* 12/2008 Komiya ................ H01M 6/005
429/246

FOREIGN PATENT DOCUMENTS

| | | |
|---|---|---|
| JP | 2000-348776 A | 12/2000 |
| JP | 2002-151051 A | 5/2002 |
| JP | 2004111219 A | 4/2004 |
| JP | 2008-016202 A | 1/2008 |
| KR | 20000005813 U | 4/2000 |
| KR | 2008-0017114 A | 2/2008 |
| KR | 20080017264 A | 2/2008 |
| KR | 100823193 B1 | 4/2008 |
| KR | 2009-0110469 A | 10/2009 |
| WO | 2008056908 A1 | 5/2008 |

* cited by examiner

BATTERY CELL OF NOVEL STRUCTURE

CROSS-REFERENCE TO RELATED APPLICATIONS

The present application is a continuation of International Application No. PCT/KR2012/009312 filed on Nov. 7, 2012, which claims the benefit of Korean Patent Application No. 10-2011-0116731, filed on Nov. 10, 2011, the disclosures of which are incorporated herein by reference.

TECHNICAL FIELD

The present invention relates to a battery cell of a novel structure and, more particularly, to a battery cell configured to have a structure in which an electrode assembly of a cathode/separator/anode structure is mounted in a battery case formed of a laminate sheet including a resin layer and a metal layer in a state in which the electrode assembly are connected to electrode terminals protruding outward from the battery case, wherein the electrode assembly is configured such that separators are respectively disposed between cathodes and anodes, each of which is formed by applying a compound including an electrode active material to a current collector, at least a portion of an inside of the battery case corresponding to an outer circumference of the electrode assembly has an upward sloping structure in which a width of the battery case increases upward in vertical section or a downward sloping structure in which the width of the battery case increases downward in vertical section, and the outer circumference of the electrode assembly corresponding to the inside of the battery case also has an upward sloping structure or a downward sloping structure.

BACKGROUND ART

As mobile devices have been increasingly developed and the demand for such mobile devices has increased, the demand for secondary batteries has also sharply increased as an energy source for the mobile devices. Accordingly, much research on batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, on the other hand, the demand for lithium secondary batteries, such as lithium cobalt polymer batteries, having high energy density, discharge voltage, and output stability, is very high.

One of the principal problems to be solved in connection with such secondary batteries is to improve the safety of the secondary batteries. Generally, a lithium secondary battery may explode due to high temperature and high pressure which may be induced in the lithium secondary battery due to the abnormal operation of the lithium secondary battery, such as an internal short circuit, overcharge exceeding allowable current and voltage, exposure to high temperature, or deformation caused by external impact, including dropping.

Figure 1:
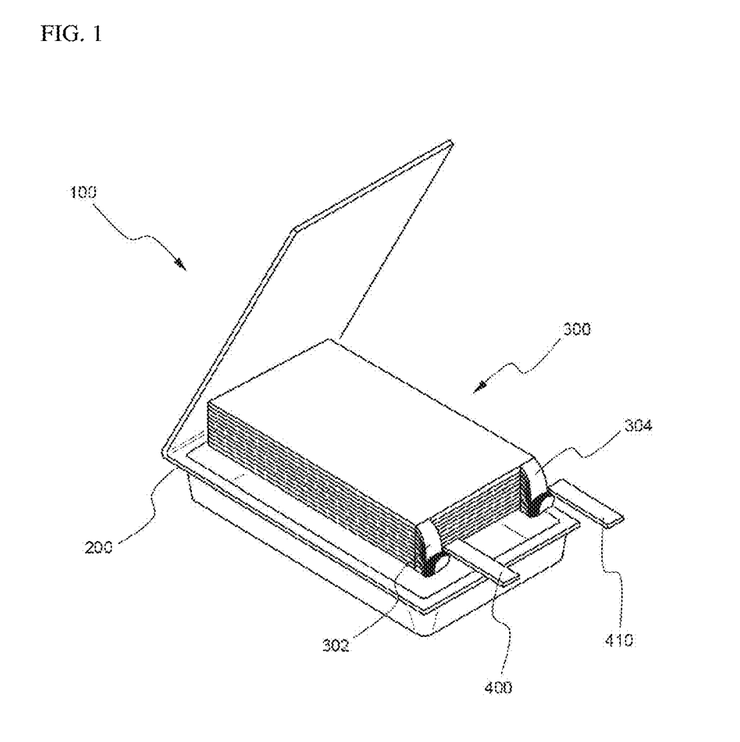
FIG. 1 is an exploded perspective view showing a pouch-shaped secondary battery including a general stacked type electrode assembly.

A general structure of a pouch-shaped secondary battery including a stacked type electrode assembly is typically shown in FIG. 1.

Referring to FIG. 1, the pouch-shaped secondary battery 100 is configured to have a structure in which an electrode assembly 300 including cathodes, anodes, and separators or solid electrolyte coating separators respectively disposed between the cathodes and the anodes is mounted in a pouch-shaped battery case 200 formed of an aluminum laminate sheet in a sealed state such that two electrode terminals 400 and 410 connected to anode and cathode tabs 302 and 304 of the electrode assembly 300 are exposed to the outside.

For the stacked type electrode assembly 300 as shown in FIG. 1, the inner upper end of the battery case 200 is spaced from the electrode assembly 300 such that the anode tabs 302 and the cathode tabs 304 are respectively coupled to the electrode terminals 400 and 410 by welding.

According to circumstances, a stacked/folded type electrode assembly or a wound type electrode assembly may be used in addition to the stacked type electrode assembly 300 as shown in FIG. 1.

Figure 2:
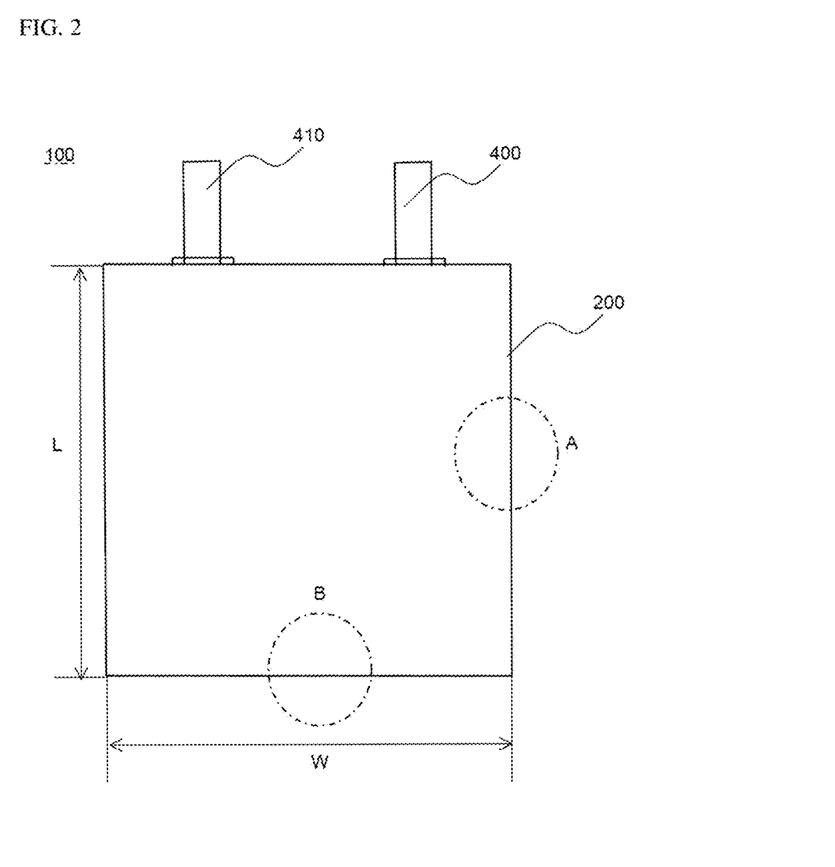
FIG. 2 is a plan view of FIG. 1.
Figure 3:
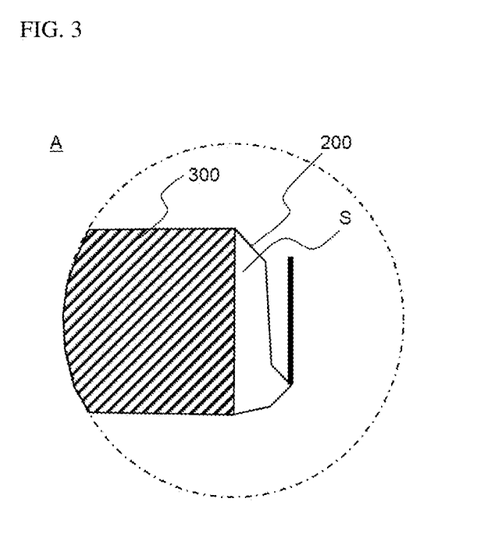
FIG. 3 is an enlarged typical view showing part A of FIG. 2.
Figure 4:
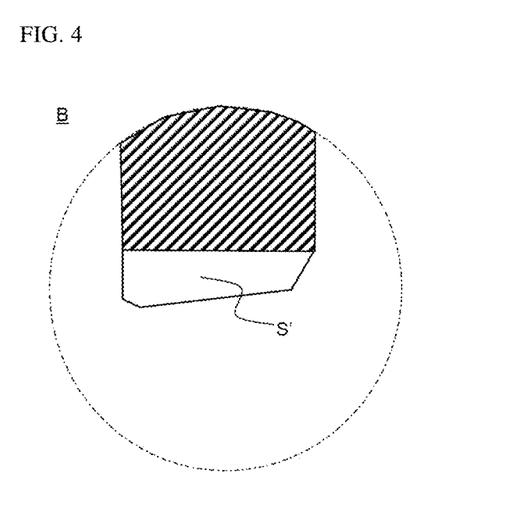
FIG. 4 is an enlarged typical view showing part B of FIG. 2.

Meanwhile, FIG. 2 is a plan view of FIG. 1 and FIGS. 3 and 4 are enlarged typical views showing part A and part B of FIG. 2, respectively.

Figure 5:
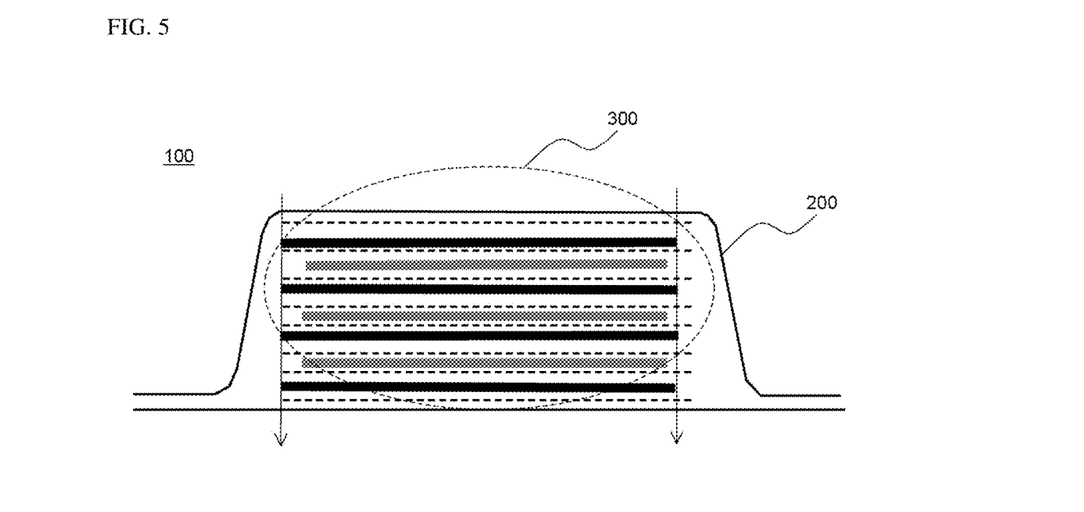
FIG. 5 is a vertical sectional view of a conventional battery cell.

In addition, FIG. 5 is a vertical sectional view typically showing a conventional battery cell.

Referring to these drawings, a conventional electrode assembly 300 is generally formed in a rectangular shape with the result that the distance between the electrode assembly 300 and the inside of a battery case 200 is not uniform. For this reason, there are present dead volumes S and S' at the left and right sides and the upper and lower parts of the battery case 200.

Such dead volumes S and S' cause deformation of the battery case 200 or the electrode assembly 300 when the battery cell 100 drops, thereby decreasing safety of the battery cell 100.

In addition, the dead volumes S and S' reduce battery capacity of the battery cell as compared with other battery cells having the same standard.

Consequently, there is a high necessity for technology that is capable of more safely and efficiently increasing the capacity of a battery cell and securing safety of the battery cell.

DISCLOSURE

Technical Problem

Therefore, the present invention has been made to solve the above problems, and other technical problems that have yet to be resolved.

It is an object of the present invention to provide a battery cell configured such that at least a portion of the inside of a battery case corresponding to the outer circumference of an electrode assembly has an upward sloping structure in which the width of the battery case increases upward in vertical section or a downward sloping structure in which the width of the battery case increases downward in vertical section and the outer circumference of the electrode assembly corresponding to the inside of the battery case also has an upward sloping structure or a downward sloping structure, thereby increasing battery capacity of the battery cell and, in addition, securing safety of the battery cell when the battery cell drops.

Technical Solution

In accordance with one aspect of the present invention, the above and other objects can be accomplished by the provision of a battery cell configured to have a structure in which an electrode assembly of a cathode/separator/anode structure is mounted in a battery case formed of a laminate sheet including a resin layer and a metal layer in a state in which the electrode assembly are connected to electrode terminals protruding outward from the battery case, wherein the electrode assembly is configured such that separators are respectively disposed between cathodes and anodes, each of which is formed by applying a compound including an electrode active material to a current collector, at least a portion of an inside of the battery case corresponding to an outer circumference of the electrode assembly has an upward sloping structure in which a width of the battery case increases upward in vertical section or a downward sloping structure in which the width of the battery case increases downward in vertical section, and the outer circumference of the electrode assembly corresponding to the inside of the battery case also has an upward sloping structure or a downward sloping structure.

The upward sloping structure and the downward sloping structure may have a slope angle of more than 1 degree and less than 90 degrees to a plane parallel to the upward direction and the downward direction. Specifically, the upward sloping structure and the downward sloping structure may have a slope angle of more than 5 degrees and less than 80 degrees to the plane parallel to the upward direction and the downward direction. More specifically, the upward sloping structure and the downward sloping structure may have a slope angle of more than 5 degrees and less than 60 degrees to the plane parallel to the upward direction and the downward direction.

In the battery cell according to the present invention, therefore, at least a portion of the inside of the battery case corresponding to the outer circumference of the electrode assembly has an upward sloping structure in which the width of the battery case increases upward in vertical section or a downward sloping structure in which the width of the battery case increases downward in vertical section, and the outer circumference of the electrode assembly corresponding to the inside of the battery case also has an upward sloping structure or a downward sloping structure. Consequently, battery capacity of the battery cell is increased as compared with other battery cells having the same standard.

In addition, the battery case is in tight contact with the electrode assembly. Consequently, it is possible to minimize deformation of the battery case when the battery cell drops.

In a preferred example, the inside of the battery case may have a downward sloping structure and the outer circumference of the electrode assembly may have a downward sloping structure based on the increase in length or width of electrodes.

In the above structure, the electrode assembly may be trapezoidal in vertical section.

In another example, the battery cell may be quadrangular in plane and the battery cell may be formed to have an upward sloping structure or a downward sloping structure corresponding to the inside of the battery case at the other sides of the battery cell excluding sides of the battery cell at which the electrode terminals are located.

In the above structure, the electrode terminals may be formed at one side or two sides of the battery cell.

Each cathode may be configured to have a structure in which a cathode compound is applied to an aluminum foil as a current collector and each anode may be configured to have a structure in which an anode compound is applied to a metal foil other than the aluminum foil as a current collector.

The anode current collector is not particularly restricted so long as the anode current collector exhibits high conductivity while the anode current collector does not induce any chemical change in a battery to which it is applied. For example, the anode current collector may be made of any one selected from a group consisting of copper, stainless steel, and nickel, or an alloy thereof.

The battery case may be a pouch-shaped case formed of an aluminum laminate sheet.

In a preferred example, the electrode assembly may be configured to have a jelly-roll type structure in which one sheet type cathode and one sheet type anode are wound in a state in which a separator is disposed between the cathode and the anode and the electrode terminals are coupled to ends of the cathode and anode current collectors.

In a preferred example, the electrode assembly may be configured to have a stacked type structure in which two or more cathodes and two or more anodes are stacked in a state in which separators are respective disposed between the cathodes and the anodes and two or more electrode tabs protruding from the cathode and anode current collectors are coupled to one electrode terminal.

In this case, the lowermost one or the uppermost one of the separators respectively disposed between the cathodes and the anodes may have a sufficient length to wrap the slopes of the upward sloping structure or the slopes of the downward sloping structure.

As a result, the cathodes and the anodes do not directly contact the upward sloping inside of the battery case or the downward sloping inside of the battery case. Consequently, it is possible to minimize the occurrence of an internal short circuit when external impact is applied to the battery cell.

In another example, the electrode assembly may be configured to have a stacked/folded type structure in which the electrode assembly comprises two or more polar bodies selected from a group consisting of a cathode plate, an anode plate, and a stacked type electrode assembly and a sheet type separator wrapping stacked surfaces and sides of the polar bodies and the polar bodies are stacked from a plane in a vertical direction such that the cathode and the anode face each other in a state in which the separator is disposed between the cathode and the anode.

In the above structure, the stacked type electrode assembly may include uppermost and lowermost electrode plates having the same polarity or different polarities.

The sides may be understood as the slopes of the upward sloping structure or the downward sloping structure.

According to circumstances, the sheet type separator may have a sufficient length to wrap the outer circumference of the stacked/folded type electrode assembly. In a case in which the outside of the stacked/folded type electrode assembly is wrapped with the sheet type separator, it is possible to securely maintain contact at stacked interfaces among the cathodes, the separators, and the anodes even when repetitive charge and discharge are performed.

The stacked/folded type electrode assembly may be manufactured by arranging one or more polar bodies selected from a group consisting of a cathode plate, an anode plate, and a stacked type electrode assembly on a sheet type separator and winding or folding the sheet type separator.

Specifically, tensile force generated during winding the sheet type separator may provide pressure for tight contact at the interfaces among the cathodes, the separators, and the anodes.

Since the stacked/folded type electrode assembly is configured to have a structure in which the sheet type separator wraps the slopes of the upward sloping structure or the downward sloping structure, the cathodes and the anodes of the stacked/folded type electrode assembly may not directly contact the upward sloping inside of the battery case or the downward sloping inside of the battery case. Consequently, it is possible to minimize the occurrence of an internal short circuit when external impact is applied to the battery cell.

The battery cell may be a lithium ion secondary battery or a lithium ion polymer secondary battery; however, the present invention is not limited thereto.

Meanwhile, the battery cell may be configured to have a structure to reduce a dead volume between the battery case and the electrode assembly. Consequently, it is possible to minimize an unnecessary dead space in the battery cell and thus to maximize battery capacity of the battery cell.

In accordance with another aspect of the present invention, there is provided a battery module including the battery cell with the above-stated construction as a unit cell.

Examples of devices in which the battery module according to the present invention may be used may include an electric vehicle, a hybrid electric vehicle, a plug-in hybrid electric vehicle, and a power storage device. In addition, the battery module according to the present invention may be used in devices, such as a laptop computer and a portable computer.

The structure of the battery module and a manufacturing method of the battery module are well known in the art to which the present invention pertains and thus a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 6:
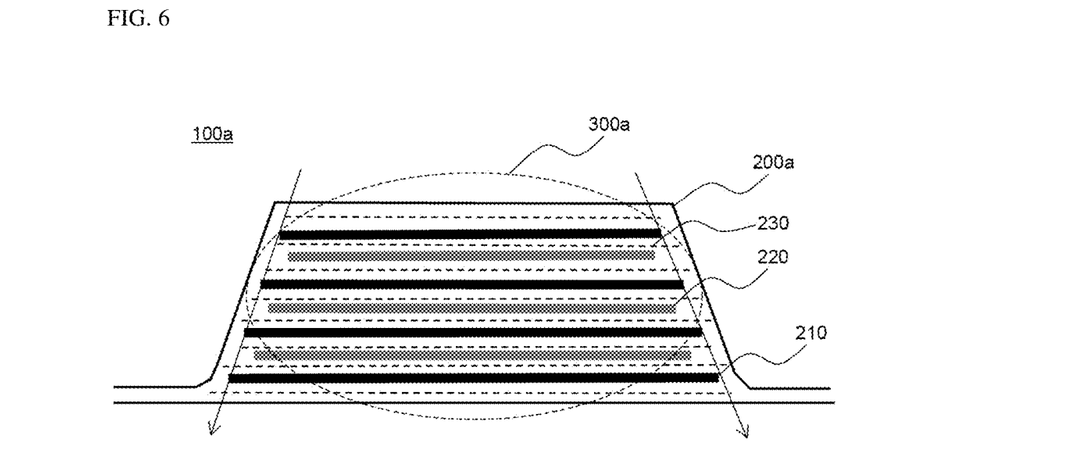
FIG. 6 is a vertical sectional view of a battery cell according to an embodiment of the present invention.

FIG. 6 is a vertical sectional view typically showing a battery cell according to an embodiment of the present invention.

Referring to FIG. 6, the battery cell 100a is configured to have a structure in which an electrode assembly 300a of a cathode 210/separator 230/anode 220 structure is mounted in a battery case 200a formed of a laminate sheet including a resin layer and a metal layer such that the electrode assembly 300a are connected to electrode terminals (not shown) protruding outward from the battery case 200a.

The electrode assembly 300a is configured such that the separators 230 are respectively disposed between the cathodes 210 and the anodes 220, each of which is formed by applying a compound including an electrode active material to a current collector. The inside of the battery case 200a corresponding to the outer circumference of the electrode assembly 300a is formed to have a downward sloping structure (indicated by arrows) in which the width of the inside of the battery case 200a increases downward when viewed in vertical section.

In addition, the outer circumference of the electrode assembly 300a corresponding to the inside of the battery case 200a is also formed to have a downward sloping structure. As a result, the dead volume between the battery case 200a and the electrode assembly 300a is considerably reduced as compared with the structure of the conventional battery cell shown in FIG. 5.

Specifically, the inside of the battery case 200a is formed to have a downward sloping structure and the outer circumference of the electrode assembly 300a is formed to have a downward sloping structure based on the increase in width of the electrodes.

The electrode assembly 300a is trapezoidal in vertical section and the battery cell 100a is quadrangular in plane.

In addition, the battery cell 100a is formed to have a downward sloping structure corresponding to the inside of the battery case 200a at the other sides of the battery cell 100a excluding the sides of the battery cell 100a at which the electrode terminals are located. The electrode terminals (not shown) are formed at only one side of the battery cell 100a.

Each cathode 210 is formed by applying a cathode compound to an aluminum foil as a current collector and each anode 220 is formed by applying an anode compound to a metal foil other than the aluminum foil as a current collector.

The battery case 200a is a pouch-shaped case formed of an aluminum laminate sheet.

The electrode assembly 300a is configured to have a stacked type structure in which four cathodes 210 and three anodes 220 are stacked in a state in which separators 230 are respectively disposed between the cathodes 210 and the anodes 220 and four cathode tabs and three anode tabs respectively protruding from cathode current collectors and anode current collectors are coupled to a cathode terminal and an anode terminal, respectively.

Figure 7:
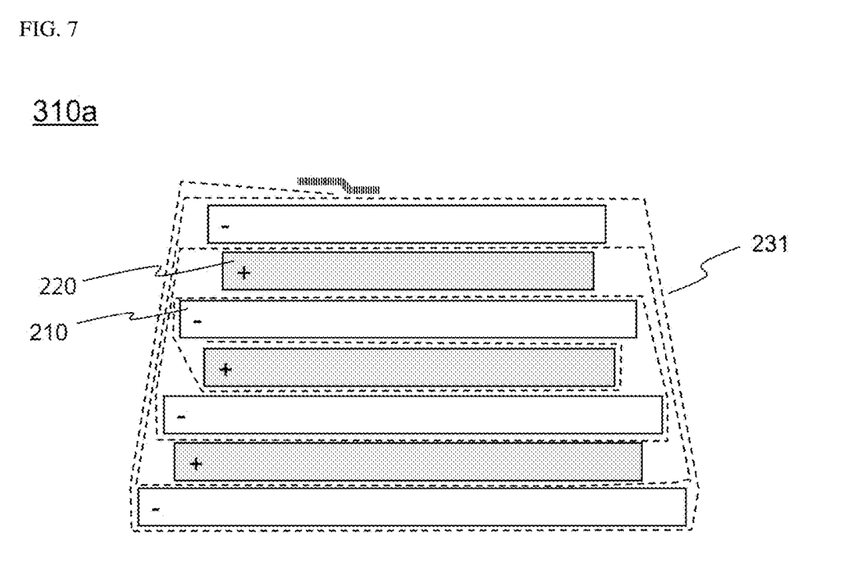
FIG. 7 is a vertical sectional view of a stacked/folded type electrode assembly according to the present invention.

FIG. 7 is a vertical sectional view typically showing a stacked/folded type electrode assembly according to the present invention. Referring to FIG. 7 together with FIG. 6, an electrode assembly 310a shown in FIG. 7 may be used instead of the electrode assembly 300a shown in FIG. 6. In this case, the slopes of the electrode assembly 310a are wrapped by a sheet type separator 231 with the result that cathodes 220 and anodes 210 may not directly contact the inside of the battery case 200a. Even for the electrode assembly 300a shown in FIG. 6, the uppermost or lowermost separator 230 may be extended to wrap the slopes of the electrode assembly 300a.

Each cathode 220 of FIG. 7 may be a stacked type electrode assembly having a cathode plate or the uppermost or lowermost electrode plate as a cathode and each anode 210 of FIG. 7 may be a stacked type electrode assembly having an anode plate or the uppermost or lowermost electrode plate as an anode.

In a case in which the cathodes 220 and the anodes 210 are stacked type electrode assemblies, those skilled in the art will appreciate from the above description that separators 230 are respectively disposed between the cathodes 220 and the anodes 210 as shown in FIG. 6.

In FIG. 7, the end of the sheet type separator 231 wrapping the slopes of the electrode assembly 310a may be fixed using adhesive tape.

Figure 8:
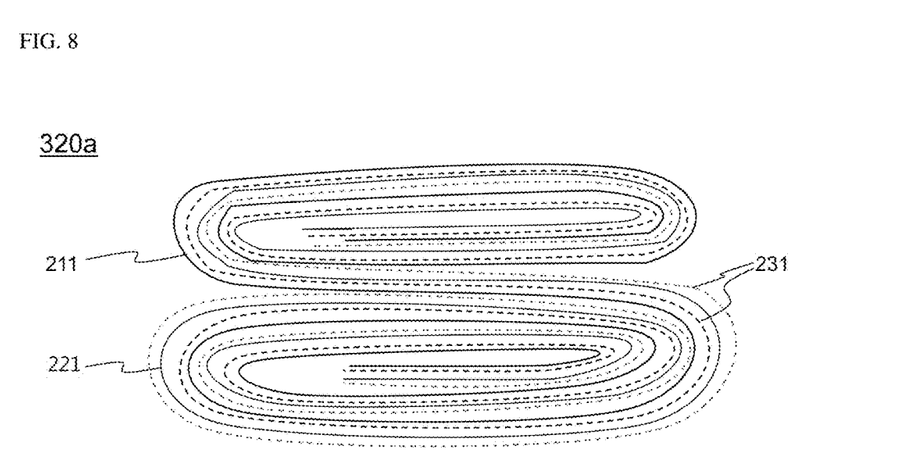
FIG. 8 is a vertical sectional view of a jelly-roll type electrode assembly according to the present invention.

FIG. 8 is a vertical sectional view of a jelly-roll type electrode assembly according to the present invention. Referring to FIG. 8 together with FIG. 6, an electrode assembly 320a shown in FIG. 8 may be used instead of the electrode assembly 300a shown in FIG. 6. The electrode assembly 320a may be manufactured by sequentially stacking a sheet type cathode 221, a sheet type separator 231, a sheet type anode 211, and another sheet type separator 231 and winding one end and the other end of the stack in a clockwise direction or in a counterclockwise direction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery cell according to the present invention is configured such that at least a portion of the inside of the battery case corresponding to the outer circumference of the electrode assembly has an upward sloping structure in which the width of the battery case increases upward in vertical section or a downward sloping structure in which the width of the battery case increases downward in vertical section and the outer circumference of the electrode assembly corresponding to the inside of the battery case also has an upward sloping structure or a downward sloping structure. Consequently, it is possible to increase battery capacity of the battery cell and, in addition, to easily secure safety of the battery cell when the battery cell drops.

The invention claimed is:

1. A battery cell configured to have a structure in which an electrode assembly of a cathode/separator/anode structure is mounted in a battery case formed of a laminate sheet comprising a resin layer and a metal layer in a state in which the electrode assembly is connected to electrode terminals protruding outward from the battery case, wherein the electrode assembly is configured such that separators are respectively disposed between cathodes and anodes, each of which is formed by applying a compound comprising an electrode active material to a current collector, at least a portion of an inside of the battery case corresponding to an outer circumference of the electrode assembly has an upward sloping structure in which a width of the battery case increases upward in vertical section or a downward sloping structure in which the width of the battery case increases downward in vertical section, the outer circumference of the electrode assembly corresponding to the inside of the battery case also has an upward sloping structure or a downward sloping structure, the battery cell is quadrangular in plane and the battery cell is formed to have an upward sloping structure or a downward sloping structure corresponding to the inside of the battery case at least one of the separators respectively disposed between the cathodes and anodes is extended to wrap slopes of the electrode assembly, the extended portion of the separator to wrap the slopes of the electrode assembly being formed along a surface parallel to the slopes of the electrode assembly, the uppermost or lowermost separator is extended to wrap the slopes of the electrode assembly, the electrode assembly is configured to have a stacked type structure, and the upward sloping structure or the downward sloping structure is formed at the other sides of the battery cell excluding sides of the battery cell at which the electrode terminals are located.

2. The battery cell according to claim 1, wherein the inside of the battery case has a downward sloping structure and the outer circumference of the electrode assembly has a downward sloping structure based on the increase in length or width of electrodes.

3. The battery cell according to claim 2, wherein the electrode assembly is trapezoidal in vertical section.

4. The battery cell according to claim 1, wherein the electrode terminals are formed at only one side of the battery cell.

5. The battery cell according to claim 1, wherein each cathode is configured to have a structure in which a cathode compound is applied to an aluminum foil as a current collector, and each anode is configured to have a structure in which an anode compound is applied to a metal foil other than the aluminum foil as a current collector.

6. The battery cell according to claim 1, wherein the battery case is a pouch-shaped case formed of an aluminum laminate sheet.

7. The battery cell according to claim 1, wherein the electrode assembly comprises uppermost and lowermost electrode plates having the same polarity or different polarities.

8. The battery cell according to claim 1, wherein the battery cell is a lithium ion secondary battery or a lithium ion polymer secondary battery.

9. A battery module comprising a battery cell according to claim 1 as a unit cell.

10. The battery cell according to claim 1, wherein the at least one of the separators respectively disposed between the cathodes and anodes extended to wrap only slopes of the electrode assembly is the uppermost or the lowermost separator.

11. The battery cell according to claim 1, wherein the upward sloping structure or the downward sloping structure has a slope angle of more than 5 degrees and less than 60 degrees to a plane parallel to an upward direction and a downward direction.

* * * * *